Dec. 9, 1924. 1,518,826
L. D. TETER
RAISING AND LOWERING MECHANISM
Original Filed Nov. 25, 1922  2 Sheets-Sheet 1
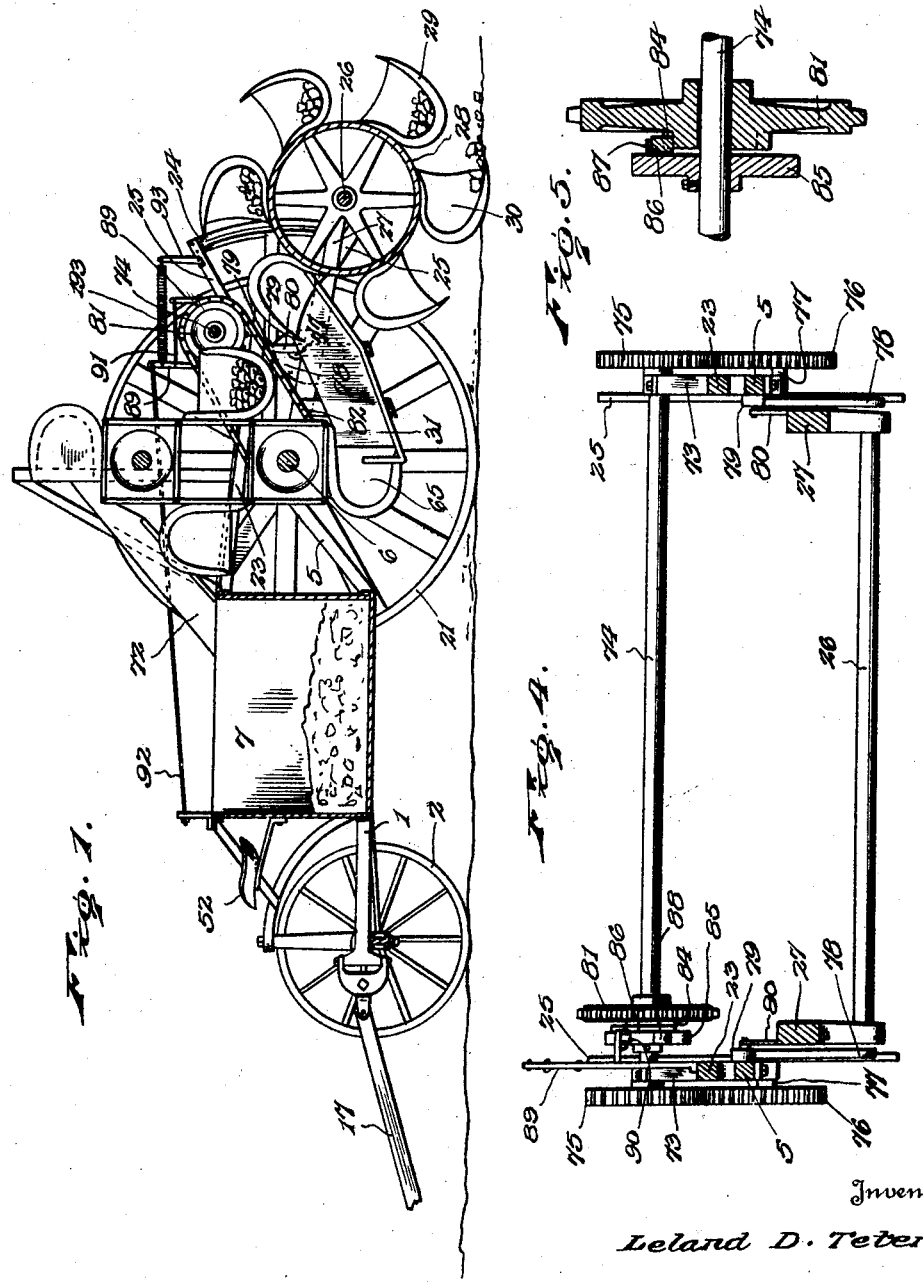
Inventor
Leland D. Teter.
By Lacey, Attorneys Dec. 9, 1924. 1,518,826
L. D. TETER
RAISING AND LOWERING MECHANISM
Original Filed Nov. 25, 1922 2 Sheets-Sheet 2
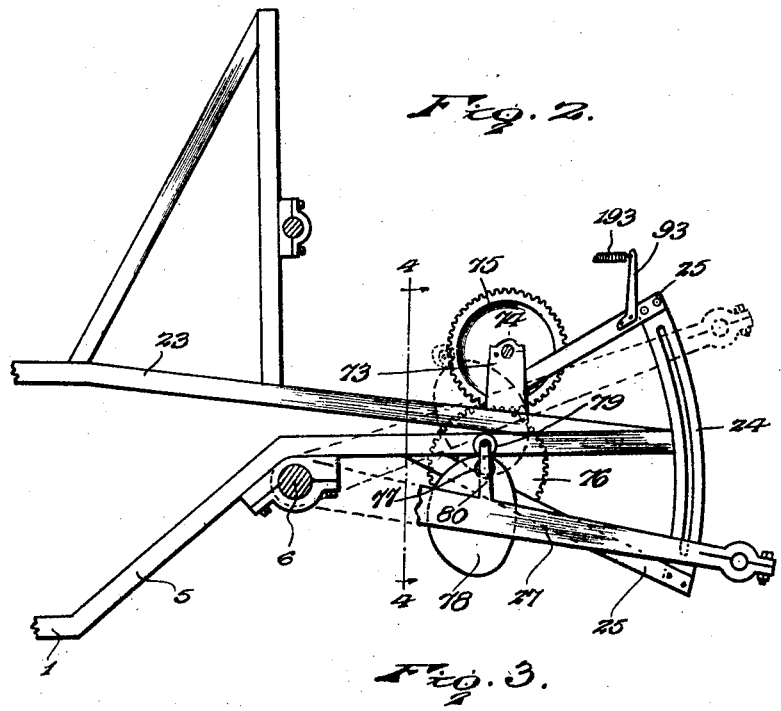
Inventor
Leland D. Teter.
By Lacy & Lacy, Attorneys Patented Dec. 9, 1924.

1,518,826

UNITED STATES PATENT OFFICE.

LELAND D. TETER, OF LIVINGSTONVILLE, NEW YORK.

RAISING AND LOWERING MECHANISM.

Original application filed November 25, 1922, Serial No. 603,200. Divided and this application filed November 23, 1923. Serial No. 676,598.

*To all whom it may concern:*

Be it known that I, LELAND D. TETER, a citizen of the United States, residing at Livingstonville, in the county of Schoharie and State of New York, have invented certain new and useful Improvements in Raising and Lowering Mechanism, of which the following is a specification.

This application is a division of an application filed by me November 25, 1922, Serial No. 603,200, the present invention seeking to provide novel means for raising and lowering the gathering members of a stone-gathering machine.

The invention is illustrated in the accompanying drawings, in which—

Figure 1 is a longitudinal section of a stone-gatherer embodying my present improvements;

Fig. 2 is an enlarged sectional elevation of a portion of the mechanism for raising and lowering the gatherer;

Fig. 3 is a similar view of another portion of the same mechanism;

Fig. 4 is a transverse section on the line 4—4 of Fig. 2, and

Fig. 5 is an enlarged transverse section on the line 5—5 of Fig. 3.

The frame of the stone-gatherer comprises sills 1 supported at their front ends by a suitable axle and steering wheels 2, a draft pole or tongue 17 being connected with the front axle. The sills carry a receptacle 7, of any approved form, for the gathered stones, and in rear of the receptacle extend upwardly, as at 5, to be carried by an axle 6 and furnish a support for the operating mechanism, driving wheels 21 being connected with the rear axle through escapement devices in a well-known manner.

Frame bars 23 are secured to the top of the receptacle 7 and extend rearwardly and downwardly therefrom to be joined to the rear ends of the main frame bars 5. To the rear extremities of the frame bars, I secure arcuate guiding plates 24, the ends of which are connected with the frame bars through braces 25 whereby the desired rigid construction will be effected. The gatherer is disposed between the guides 24 and between the rear extremities of the frame bars so that it may be lowered into operative position and raised into inoperative position without interference from any portion of the frame, and it is carried by a shaft 26 mounted in and carried by the rear ends of bars 27 which are pivotally mounted at their front ends upon the rear axle 6. The gatherer consists of a drum 28, which may be of any preferred detail construction, and teeth 29 of hooked or scoop-like form. These teeth are secured rigidly upon the drum in rows parallel with the axis of the same and, of course, rotate about the shaft 26 with the drum. In the working position illustrated in Fig. 1, the ends of the teeth in the several rows of teeth will successively penetrate the surface of the ground and pass under the stones so as to loosen and remove the same. Both end teeth of each row are provided with side plates or retainers 30 so that the stones cannot escape over the ends of the several gangs or baskets formed by the teeth. In advance of the drum, a chute 31 is supported by the gathering arms 27, and this chute is suitably constructed to permit the hooked teeth 29 to pass forwardly and downwardly and deposit the gathered stones in the chute down which the stones will roll to be taken up by elevator members 65. The elevator delivers the stones into an upper chute 72 through which they pass to the receptacle 7.

The gatherer is rotated through gearing (not shown) connecting its shaft 26 with the axle 6.

To effect the raising and lowering of the gathering instrumentality, I provide mechanism which may be readily thrown into or out of operative position by the driver of the machine but it will be actuated by power transmitted from the rear axle. Mounted in bearings 73 upon the frame bars 23 is a shaft 74 which extends across the machine, and upon the ends of this shaft 74 are secured gear wheels 75 which mesh with gear wheels 76 secured upon the outer ends of stub shafts 77 which are mounted in suitable bearings upon the under side of the frame bars 5. Upon the inner ends of the stub shafts 77 are secured cams or eccentrics 78 which are so disposed that their peripheries will ride under rollers 79 carried by brackets 80 rising from the gatherer arms 27. Obviously, if the cam or eccentric be rotated so that its high part or greatest radius will be above or extending upwardly from the shaft 77, the roller 79 will be lifted and the gatherer-supporting arm 27 will be likewise swung upwardly and if the eccentric be disposed with its greatest radius below the stub shaft, the gatherer-carrying arm 27 and the gatherer will be lowered. To effect the desired movement of the eccentric or cam, a sprocket wheel 81 is mounted upon the shaft 74 and is operatively connected by a chain 82 with a sprocket upon the axle 6. The sprocket 81 is loose upon the shaft 74 and is constructed upon its outer side with a ratchet disk 84. Secured upon the shaft alongside the said ratchet is a disk 85 having a pawl 86 pivotally mounted upon its side in position to engage the said ratchet 84 and normally forced to said ratchet by a spring 87, as will be readily understood upon reference to Fig. 3. In the periphery of the disk 85 are diametrically opposite notches 88, across one of which notches one end of the dog or pawl 86 extends. Mounted upon the frame in front and in rear of the disk 85 are levers 89 carrying rollers 90 adapted to engage the notches 88 and thereby hold the disk against movement and release the dog 86 from the ratchet 84. A link 91 connects the levers for simultaneous movement and the parts are so arranged relative to the respective pivots that the rollers 90 will be moved in opposite directions upon actuation of the levers. A cable or other flexible connection 92 is attached to the upper end of the forward lever 89 and extends to the front of the machine within convenient reach of the driver upon the seat 52. A post 93 rises from the arm 25 in rear of the levers 89 and a retractile spring 193 extends between and is secured to said post and the forward lever 89 so as to hold the lever normally in its rear position with the rollers 90 engaging the notches 88 and holding the disk 85 against movement, the pawl 86 being released from the ratchet 84. The sprocket 81 rotates constantly during the travel of the machine. If the cable 92 be pulled so that the levers 89 will be set as shown in Fig. 3, the dog 86 will engage the ratchet and the rotation of the sprocket 81 will then impart movement to the shaft 74 which will be transmitted through the gears 75 and 76 to the cams or eccentrics 78 and the gatherer consequently raised or lowered. When the cable 92 is pulled forward, the rollers 90 are withdrawn from the notches 88 and the dog or pawl 86 is at once thrown into engagement with the ratchet 86 and the shaft 74 rotated. The cable is held only momentarily and the spring 193 then retracts and swings the forward lever 89 rearwardly thus holding the rollers 90 to the periphery of the disk 85 so that, when the disk has made one-half a revolution, the rollers will reenter the notches 88, one roller bearing upon the pawl and releasing it from the ratchet. A second pull upon the cable will permit the disk and the cams to complete the revolution so that a slight pull upon the cable will result in automatic elevation of the gatherer and a second pull will result in its return to working position.

Having thus described the invention, what is claimed as new is:

1. In a machine for the purpose set forth, the combination of a supporting frame, arms pivotally mounted upon the frame, a gatherer carried by said arms, cams mounted upon the supporting frame, means whereby movement of said cams will effect raising or lowering movement of the pivoted arms, a shaft upon the frame, operative connections between said shaft and the cams, and means upon the frame for rotating said shaft.

2. In a machine for the purpose set forth, the combination of a supporting frame, arms pivotally mounted upon the frame, a gatherer carried by said arms, brackets upon the upper sides of said arms, eccentrics mounted upon the frame below and engaging said brackets, means mounted upon the frame for rotating said cams, and means upon the frame for rendering said rotating means operative or inoperative.

3. In a machine for the purpose set forth, the combination of a supporting frame, arms pivotally mounted upon said frame, a gatherer carried by said arms, brackets upon the said arms, cams upon the frame below and engaging said brackets, a shaft upon the frame, gearing connecting said shaft with the cams and including a loosely mounted sprocket on the shaft, a disk fixed upon the shaft alongside said sprocket, a ratchet on the side of the sprocket, a dog on the disk adapted to engage said ratchet, means for rotating the said sprocket, and means for releasing the said dog from said ratchet.

In testimony whereof I affix my signature.

LELAND D. TETER. [L. S.]